Figure 2:
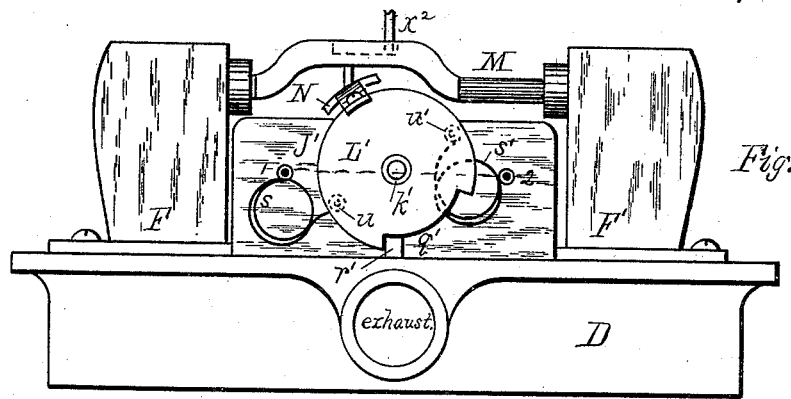

(No Model.) 2 Sheets—Sheet 1.

F. W. HOOD & L. W. LOMBARD.
APPARATUS FOR ACTUATING THE VALVES OF FLUID METERS.

No. 331,136. Patented Nov. 24, 1885.

Witnesses.
H. E. Lodge
A. F. Hayden

Inventors.
Freeman W. Hood.
Levi W. Lombard.
H. Curtis atty.

(No Model.) 2 Sheets—Sheet 2.

F. W. HOOD & L. W. LOMBARD.
APPARATUS FOR ACTUATING THE VALVES OF FLUID METERS.

No. 331,136. Patented Nov. 24, 1885.

Witnesses.
H. E. Lodge
A. F. Hayden

Inventors.
Freeman W. Hood.
Levi W. Lombard.
F. Curtis atty

UNITED STATES PATENT OFFICE.

FREEMAN WESTON HOOD AND LEVI WILLIAM LOMBARD, OF BOSTON, MASSACHUSETTS, ASSIGNORS, BY DIRECT AND MESNE ASSIGNMENTS, TO THE LANG HYDRAULIC MACHINE COMPANY, OF PORTLAND, MAINE.

APPARATUS FOR ACTUATING THE VALVES OF FLUID-METERS.

SPECIFICATION forming part of Letters Patent No. 331,136, dated November 24, 1885.

Application filed December 26, 1884. Serial No. 151,196. (No model.)

*To all whom it may concern:*

Be it known that we, FREEMAN WESTON HOOD and LEVI WILLIAM LOMBARD, citizens of the United States, residing at Boston, in the county of Suffolk and State of Massachusetts, have invented certain new and useful Improvements in Apparatus for Actuating the Valves of Fluid-Meters; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in apparatus for actuating the valves of fluid-meters, but more especially in this case to "diaphragm-meters," so called, in which an elastic diaphragm is employed in lieu of a piston, and its pulsations in the measuring-chamber are recorded in order to ascertain the quantity of fluid passing through the apparatus.

Our invention relates, especially, to the employment of a valve, and means whereby the mechanism which operates said valve, although having no momentum in itself, still imparts a sudden momentum to the valve, and thus not only overcomes the dead-points, but maintains said valve always in one extreme of movement. Moreover, any tendency to stop on a partial stroke is prevented, since the valve remains in such a position after each and every change that it cannot be moved until at the end and completion of each pulsation of the diaphragm, and, no matter how small the flow of water is or how low the pressure may be, the momentum imparted to the valve in order to change its position is always the same; also, in the arrangement of operative parts of said valve, as herein shown, whereby the passage of water through the arm-ports, which otherwise would occur by the use of the sliding yoke heretofore in use, is avoided, and a water-tight compartment is secured between the valve-chamber and the measuring-chamber, while the friction resulting from the movement of said yoke is almost entirely obviated.

Figure 1:
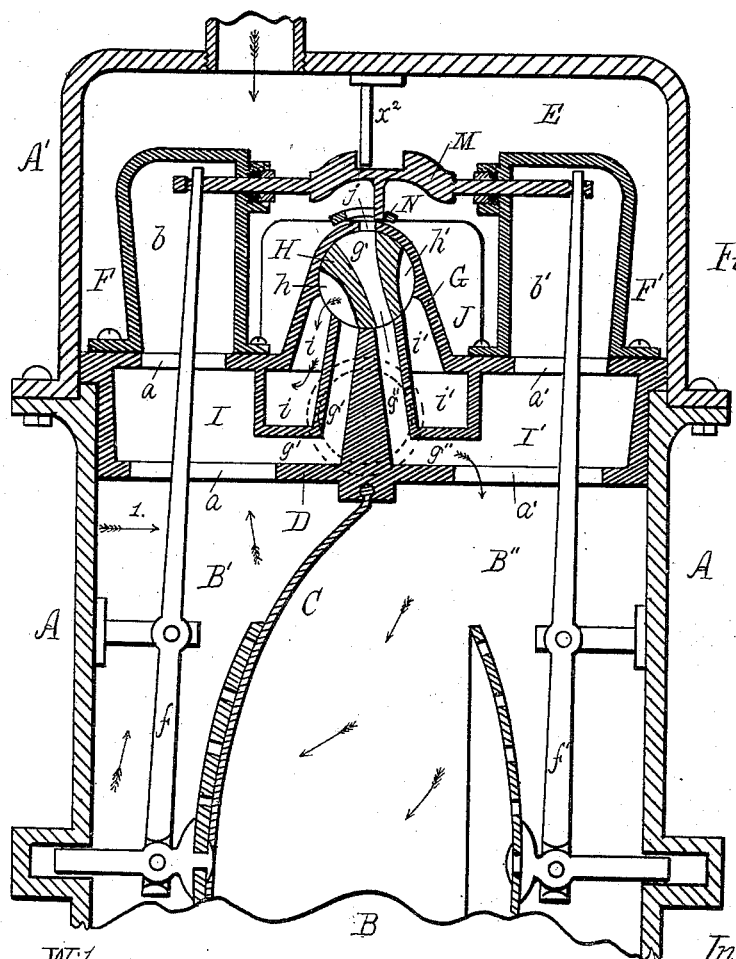
Figure 3:
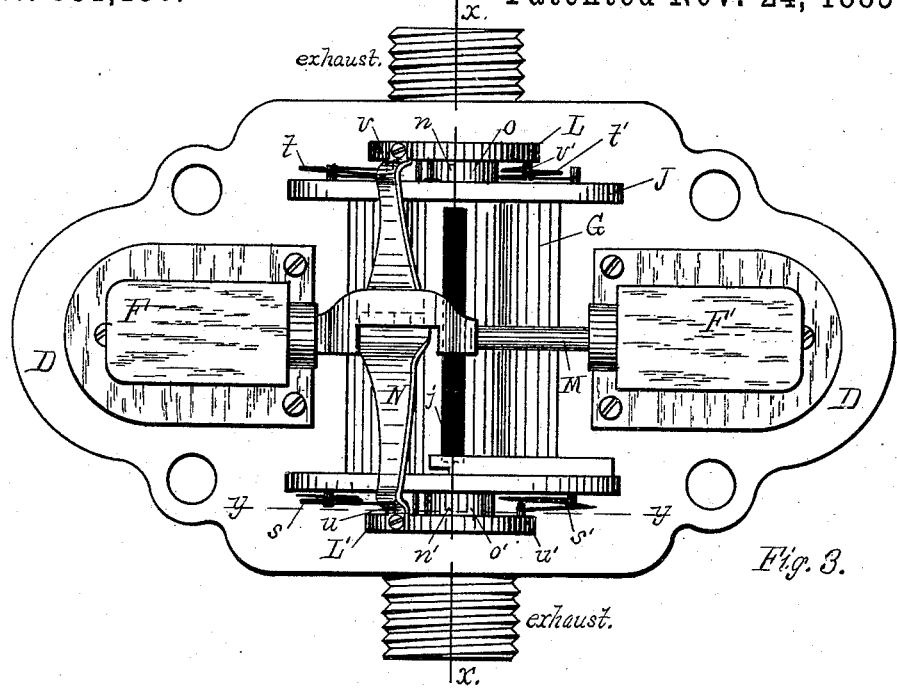
Figure 4:
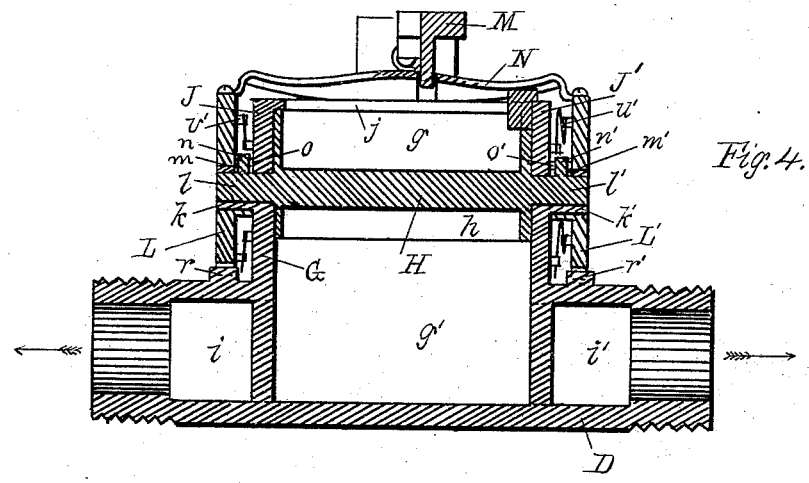
Figure 5:
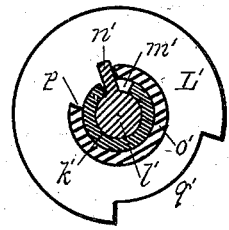

The drawings accompanying this specification represent, in Figure 1, a vertical central section of a valve adapted to a fluid-meter and embodying our invention. Fig. 2 represents a side elevation of the valve and its operative mechanism, while Fig. 3 is a plan of the same. Fig. 4 is a vertical section on line $xx$ of Fig. 3, and Fig. 5 on line $yy$ of Fig. 3.

In the above drawings we have represented at A the exterior shell of a diaphragm-meter surmounted by the cap A', in which the general construction of the principal parts is as usual in meters of this class.

B represents the measuring-cylinder, and centrally located thereof, and dividing it into two chambers, B' B'', is the diaphragm C. The measuring-cylinder is surmounted by a chambered plate, D, provided with the ports $a\ a$ $a'\ a'$, and separates said measuring-chambers from the valve-chamber E. Thus fluid is prevented from circulating freely between said chambers, but can pass from one to the other only through proper passages (exhaust and supply) formed in the plate D.

Resting upon and tightly secured to the plate D, and over the ports $a\ a'$, are two hollow casings, F F', forming the chambers $b\ b'$, in which the actuating valve-arms $f f'$, pivoted to some fixed portion of the shell A, reciprocate by means of the diaphragm C, pressing against the foraminated disks secured to the lower extremities of said arms as in other diaphragm-meters. Furthermore, the plate D is provided with a semi-cylindrical hollow rib or projection, G, forming the valve-case, which contains an oscillating valve, H, constructed with the inlet-passage $g$ and the exhaust-passages $h\ h'$. This inlet-passage $g$ in the valve co-operates with the inlet-passages $g'\ g''$ in the plate D, and leads into the chambers I I', while the exhaust-passages $h\ h'$ co-operate, respectively, with the exhaust-passages $i\ i'$, leading into the same chambers, I I', which latter are connected by means of the ports $a\ a'$ with the measuring-chambers B' B'', respectively. Said ports and passages are so arranged that while the fluid is exhausting from one side of the diaphragm fresh fluid is passing in upon the other side to be measured.

The exhaust-passages from the apparatus, which lead to and supply the building, are two in number, and each communicates with the exhaust-passages $i\ i'$, while the main supply of liquid enters through the inlet in the cap $A'$, and the fluid communicates and passes directly to the inlet-port $j$, opening into the valve-passage $g$, and thence it passes through one of the passages $g'\ g''$, dependent upon the position of the valve at the time, and emerges into one of the chambers $I\ I'$, and thus actuates the diaphragm upon one side or the other, according to the circumstances.

We now enter upon the description of the first part of our invention—viz., the means by which the valve is actuated and given a certain momentum to prevent a dead-center or inoperative point, which sometimes occurs and renders a meter useless until opened and manually operated. At each end of the semi-cylindrical projection G, and forming a part of the casting, are disposed rectangular plates $J\ J'$, upon which are formed similar circular hubs, $k\ k'$, centrally bored to receive the end journals, $l\ l'$, of the valve H. These hubs are similarly provided with slots $m\ m'$, in which reciprocate pins or studs $n\ n'$, set in the journals $l\ l'$ of the valve and at right angles to the longitudinal axis of the latter. Furthermore, we have mounted upon the hubs $k\ k'$ two spring-actuated disks, $L\ L'$, the central bore or journal being extended by casting upon their rear faces short hubs or shoulders $o\ o'$, slotted at $p\ p'$, and with which the studs $n\ n'$, before mentioned, engage. Diametrically opposite these slots $p\ p'$ and upon the disks $L\ L'$ are cut the peripheral notches $q\ q'$, which engage the stops or abutments $r\ r'$ upon the face of the plate D.

The actuating movement of the valve H is effected by means of the diaphragm, under the influence of the liquid pressing against the arms $f\ f'$, which move the connecting-rod M, the latter passing through the stuffing-boxes in the castings $F\ F'$, and this movement of the rod is transmitted through the bar M by means of a short arm attached to the rod M and extending into a slot in the bar N. This latter is firmly attached to the peripheries of the actuating-disks $L\ L'$, as shown in Figs. 2 and 3. Upon the inside face of each of these oscillating disks we have secured the free or movable ends of a pair of springs, $s\ s'$ $t\ t'$, while their other and fixed ends are made fast to the plates $J\ J'$. The studs $u\ u'\ v\ v'$, by which the springs are secured to the disks $L\ L'$, are located on a diameter at right angles to a diameter passing through the center of the notches $q\ q'$.

The operation of this valve is as follows, it being understood that the position of the valve is as shown in Fig. 1, and with the diaphragm moving and actuating the lever $f$ in the direction of arrow 1: As the diaphragm is gradually distended by the pressure of the liquid, the arm $f$ is moved, thrusting the connecting-rod M in the same direction, and with it the bar N. This rotates the disks $L\ L'$ against the pressure of their springs, which act unitedly, and the left-hand ends of the notches $q\ q'$ move away from their stops $r\ r'$, while the valve remains stationary, since the right-hand ends of the slots $p\ p'$ in the shoulders or hubs $o\ o'$ of these disks move away from studs $n\ n'$ in the valve, and the latter is maintained in place by pressure of water passing through it. The movement of the diaphragm continues until it has reached its complete pulsation, when this pulsation has carried the arm N so far along as to rotate the disks $L\ L'$ in such a position that their studs $u\ u'\ v\ v'$, carrying the free ends of the springs, have passed the line 1 2, and their tension is then free to be relieved, and thus exerted upon their disks, which are given a sudden onward movement, and thus momentum dependent upon the springs and a quick blow and impulse are imparted to change the valve by the ends of the slots $o\ o'$ striking the studs $n\ n'$, which latter are free to move to the opposite ends of slots $m\ m'$ in the hubs $k\ k'$, while at the same instant this is effected the right-hand ends of the notches $q\ q'$ have reached the opposite sides of the abutments or stops $r\ r'$, and the valve is now maintained in position indirectly by the springs. To permit of movement of the bar N, when it is carried by the action of the springs upon the disks independently of the connecting-rod M and its actuating-arms $f\ f'$, we have slotted said bar N transversely, and have disposed a short pendent arm from said rod to engage said slot.

In the drawings, Fig. 1, the supply-fluid is shown as passing through the valve H, by the passage $g''$, into the chamber $I'$, port $a'$, and measuring-chamber $B''$, and forcing the diaphragm C toward the left, while at the same time exhaust-passages $i'\ h'$ are closed, and the measured or exhaust liquid to the building is now passing from the measuring-chamber $B'$, by way of the port $a$, chamber I, passages $g'$, $h$, and $i$ to the main exhaust.

Upon the shifting of the valve, as described in a previous paragraph, the passage $g$ now cooperates with the passage $g'$, chamber I, and port $a$ to the chamber $b'$, while $h$ and $i$ are closed, and fluid now exhausts from $B''$ by way of port $a'$, chamber $I'$, and passages $g''$, $h'$, and $i'$ to the house.

The registering mechanism is to be located in any desirable spot on the cap $A'$, and is operated by a notch or its equivalent formed in the connecting-rod M, engaging with and striking a pin, $x^2$, or arm attached to and operating said mechanism in some one of the usual forms now in use.

There are many advantages obtained by this arrangement and operation of the valve, as above described, as the latter always remains in one of its extremes of movement, and is not dependent at all upon the flow of the liquid, which has been one great source of trouble and cause of stoppage in meters. This trouble has generally occurred under low pressure or frequent small demands, as in apartment-houses.

Thus where but a very small quantity of water is used at intervals an opportunity occurs of bringing a valve into such a position as to stop the apparatus.

By our present device the valve cannot change gradually; but its change, when made, is sudden and completed instantly. Thus, no matter how small the flow of liquid or low the pressure until the diaphragm or other actuating mechanism has reached a certain point, the valve remains fixed. When that point has been attained, sufficient energy has then been stored to positively change the valve to its opposite extreme of movement, and a dead-center or partial change of the valve is rendered an absolute impossibility.

We do not desire to be limited to the precise application of the valve-actuating mechanism to a diaphragm-meter, as herein described, as it may, by simple mechanical skill, involving no invention, be easily adapted to operate a piston-meter, in which case the stroke of the piston would be the prime mover in lieu of the pulsations of the diaphragm.

A construction similar in most respects to that covered by claims 1, 2, and 5, but using only one disk and no diaphragm, is shown in the pending application No. 149,467, of Levi William Lombard, one of the present applicants.

We claim—

1. In combination with an oscillating diaphragm and a pair of levers operated thereby, a disk and intervening connections actuated by said levers, a pair of studs, $u\ u'$, on opposite sides of said disks, a pair of springs, $s\ s'$, which bear against said studs, and a valve which is operated by said disk and springs when the latter are allowed to act by the change in position of said studs, substantially as set forth.

2. In combination with diaphragm C, levers $f f'$, and connecting-rod M, having a downward extension, the slotted bar N, engaged thereby, a disk attached to said bar and provided with a peripheral notch, a pair of springs which actuate said disk when it passes a certain point in rotation, and a valve provided with a stop or lug that enters said peripheral notch in the disk, for the purpose set forth.

3. In a diaphragm-meter, the combination, with the measuring-chamber and valve-chamber, of a dividing-plate constructed with secondary chambers provided with stuffing-boxes, wherein the actuating valve-arms reciprocate, and free circulation is thereby prevented between said measuring and valve chambers, except through proper passages, substantially as herein set forth.

4. In a device for measuring liquid, the combination, with the diaphragm and its rocking arms, of the valve rod or yoke moving within stuffing-boxes, whereby lifting of the yoke is prevented, and all communication between the measuring and valve chambers is prevented except through the proper passages, all substantially as and for the purposes herein described.

5. In a measuring device, the combination, with the chambered division-plate, of the oscillating valve mechanically operated by energy stored through the movement of the diaphragm, substantially as herein set forth.

6. In a mechanically-operated valve, the combination, with said valve mounted in fixed bearings, of the spring-actuated disks oscillating loosely upon the exterior periphery of said bearings, whereby the disks are allowed to move without affecting the valve until energy has been stored sufficient to operate said valve positively from one extreme of movement to the other, substantially for the purposes herein described.

7. In combination with the connecting-rod operated by the valve-arms and the diaphragm, the spring-actuated oscillating notched disks and similarly-notched hubs so disposed that their primary movements do not affect the valve, which remains unchanged until by the further advance of said disks the tension of said springs hitherto confined is free to be exerted upon the valve to shift it to one of its extremes of movement, substantially as stated.

8. In general combination, the valve H, provided with the radial pins $n\ n'$, moving in the slots $m\ m'$, formed in the fixed bearings $k\ k'$, the disks L L', notched at $q\ q'$, and their hubs $o\ o'$, similarly but diametrically notched at $p\ p'$, said disks loosely oscillating upon their bearings $k\ k'$, and the springs $s\ s'\ t\ t'$, actively induced by the reciprocating rod N through the pressure of liquid on the diaphragm, all operating and arranged substantially for the purposes herein set forth.

In testimony whereof we affix our signatures in presence of two witnesses.

FREEMAN WESTON HOOD.
LEVI WILLIAM LOMBARD.

Witnesses:
H. E. LODGE,
A. F. HAYDEN.